(12) United States Patent
Larson

(10) Patent No.: US 10,281,908 B2
(45) Date of Patent: May 7, 2019

(54) WIRELESS COMMUNICATION ENABLED RELAY

(71) Applicant: Littelfuse, Inc., Chicago, IL (US)

(72) Inventor: Kip M. Larson, Rapid City, SD (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/790,286

(22) Filed: Oct. 23, 2017

(65) Prior Publication Data

US 2018/0129194 A1 May 10, 2018

Related U.S. Application Data

(60) Provisional application No. 62/417,419, filed on Nov. 4, 2016.

(51) Int. Cl.
*H02K 17/32* (2006.01)
*G05B 23/02* (2006.01)
*H01H 71/02* (2006.01)
*H02H 3/00* (2006.01)
*H02H 7/085* (2006.01)
*H02H 7/09* (2006.01)

(52) U.S. Cl.
CPC ......... *G05B 23/0205* (2013.01); *H01H 71/02* (2013.01); *H02H 3/006* (2013.01); *H02H 7/0856* (2013.01); *H02H 7/09* (2013.01)

(58) Field of Classification Search
CPC ....... G05B 23/0205; H02H 7/09; H05K 1/148
See application file for complete search history.

(56) References Cited

U.S. PATENT DOCUMENTS

| 4,319,298 A * | 3/1982 | Davis ............... H02H 3/006 361/24 |
| 5,214,559 A * | 5/1993 | Zerbian ............. H01H 1/0015 318/490 |
| 5,948,526 A * | 9/1999 | Wilheim ............ B32B 15/08 428/345 |
| 6,259,978 B1 | 7/2001 | Feely |
| 9,128,137 B2 | 9/2015 | Troxler et al. |
| 2002/0130103 A1 | 9/2002 | Zimmerman et al. |
| 2012/0187770 A1* | 7/2012 | Slota ................. H02J 3/42 307/87 |
| 2015/0099464 A1 | 4/2015 | Kiat et al. |
| 2015/0135016 A1 | 5/2015 | Glaser et al. |
| 2016/0270227 A1* | 9/2016 | Wu .................. H05K 1/0204 |
| 2016/0345440 A1* | 11/2016 | Kasagani ........... H05K 3/0079 |

OTHER PUBLICATIONS

International Search Report for International Patent Application No. PCT/US17/057963, dated Jan. 18, 2018.

\* cited by examiner

*Primary Examiner* — Karen Masih

(57) ABSTRACT

A motor protection relay including a housing and a printed circuit board disposed within the housing, the printed circuit board including a central processing unit and a wireless communication interface, the wireless communication interface adapted to receive wireless communication signals for configuring operating parameters of the motor protection relay via the central processing unit.

6 Claims, 4 Drawing Sheets

WIRELESS COMMUNICATION ENABLED RELAY

CROSS-REFERENCES TO RELATED APPLICATIONS

This application claims the benefit of U.S. Provisional Patent Application No. 62/417,419, filed Nov. 4, 2016, which is incorporated by reference herein in its entirety.

BACKGROUND

Field

The present disclosure generally relates to motor protection relays. More particularly, the present disclosure relates to a motor protection relay that is enabled for wireless communication.

Description of Related Art

Motors are widely used throughout industry to transform electrical energy into mechanical energy that may be used to perform work. Motors are often necessary pieces of equipment for performing numerous industrial tasks. Because motors are such an integral part of many industries, loss of use of a motor can cause significant delays and loss of income while the motor is off-line. Therefore, motors are often monitored and protected against overload conditions, ground faults, and the like. Motor protection relays are generally used to provide such monitoring and protection functions.

A conventional motor protection relay is typically programmed to determine various conditions of an associated motor, and provides protection to the motor by taking the motor off-line when certain conditions are determined to be present. For example, a conventional motor protection relay may be programmed to determine a temperature of an associated rotor, and take the motor off-line if the temperature exceeds a predetermined value. A motor protection relay may also be programmed to detect overload conditions, short-circuits, and many other fault conditions related to the motor.

The programming of a conventional motor protection relay is generally accomplished at the time the motor protection relay is manufactured. Alternatively, programming may be performed manually by a technician when a relay is installed using an interface that is physically located on the motor protection relay. The interface may include one or more input/output devices on an exterior of a housing associated with the motor protection relay.

Programming and configuring a motor protection relay using an interface that is physically located on the relay is associated with a number of drawbacks. For example, adjusting or modifying the configuration of the relay necessarily requires a technician to physically access the motor protection relay, which can often be time-consuming and cumbersome. Furthermore, physically accessing the motor protection relay to adjust or modify configuration settings when the motor protection relay is deployed in the field may expose the technician to safety hazards, including high voltages, arc flashes, and the like, which may be prevalent in environments where conventional protection relays are deployed. Still further, interfaces located on motor protection relays may, in some cases, provide conduits that allow the ingress of water and particulate matter into the interior of a relay, which can cause damage to sensitive electronic components. Sealing a motor protection relay against environmental elements may add cost to, and may increase the form factor of, a relay, both of which are undesirable.

It is with respect to these and other considerations that the present improvements may be useful.

SUMMARY

This Summary is provided to introduce a selection of concepts in a simplified form further described below in the Detailed Description. This Summary is not intended to identify key or essential features of the claimed subject matter, nor is this Summary intended as an aid in determining the scope of the claimed subject matter.

An embodiment of a motor protection relay in accordance with the present disclosure may include a housing, a printed circuit board disposed within the housing, the printed circuit board including a central processing unit and a wireless communication interface, the wireless communication interface adapted to receive wireless communication signals for configuring operating parameters of the motor protection relay via the central processing unit.

Another embodiment of a motor protection relay in accordance with the present disclosure may include a housing, a printed circuit board disposed within the housing, the printed circuit board including a first circuit board section and a second circuit board section electrically connected to one another by a flexible interconnect member.

Another embodiment of a motor protection relay in accordance with the present disclosure may include a housing, a printed circuit board disposed within the housing, the printed circuit board including a central processing unit and a wireless communication interface, the wireless communication interface adapted to receive wireless communication signals for configuring operating parameters of the motor protection relay via the central processing unit, wherein the motor protection relay is devoid of a physical user interface located within, or on an exterior of, the housing.

DETAILED DESCRIPTION

Exemplary embodiments of a motor protection relay in accordance with the present disclosure will now be described more fully hereinafter with reference to the accompanying drawings. The motor protection relay may, however, be embodied in many different forms and should not be construed as being limited to the embodiments set forth herein. Rather, these embodiments are provided so that this disclosure will convey certain exemplary aspects of the motor protection relay to those skilled in the art.

Figure 1:
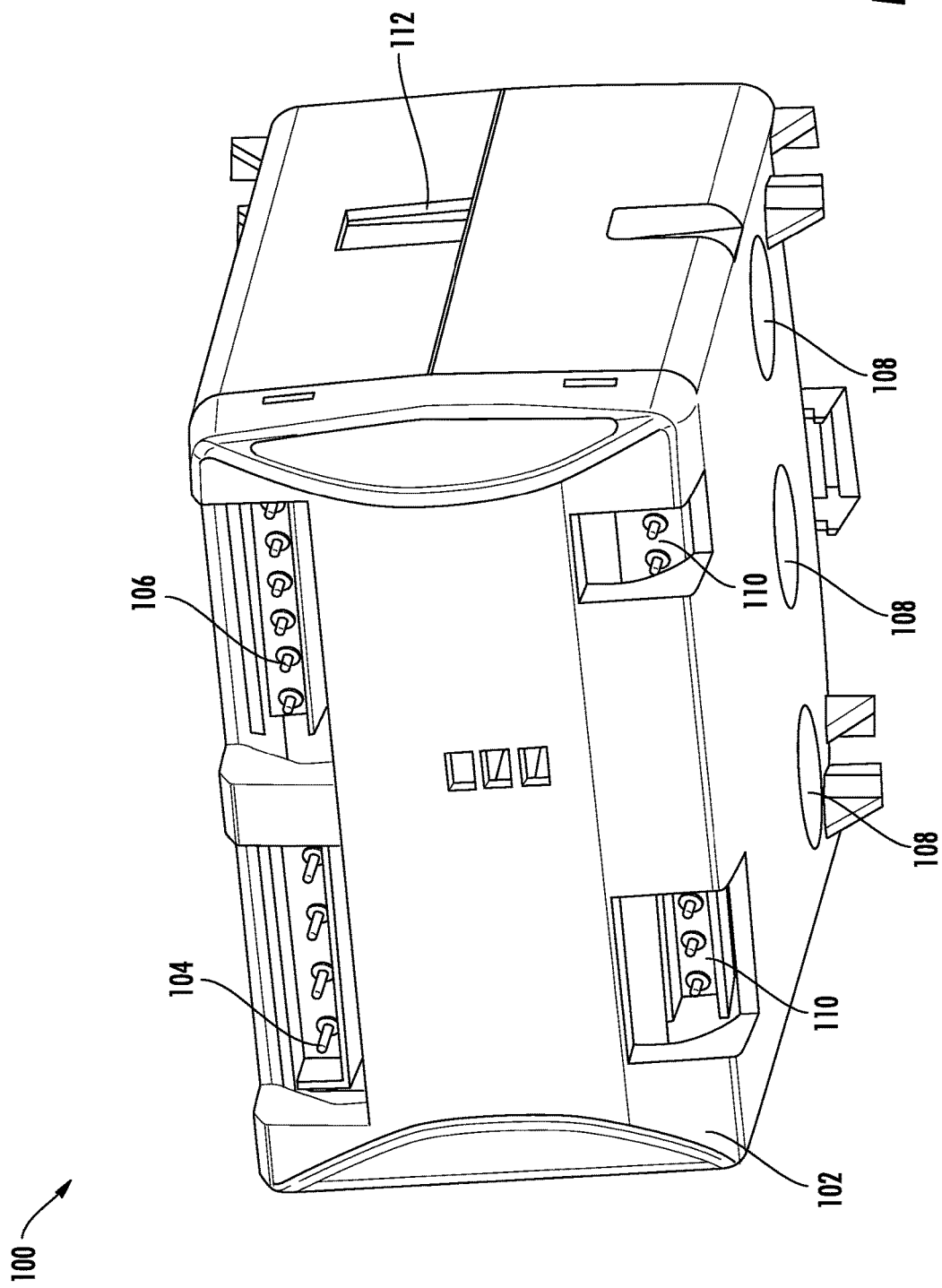
FIG. 1 is a perspective view illustrating a motor protection relay according to an embodiment of the present disclosure.

FIG. 1 illustrates a motor protection relay 100 according to an embodiment of the disclosure. The motor protection relay 100 may include a housing 102 which may be formed of a durable, electrically insulating, moisture resistant material, for example. The motor protection relay 100 may include a plurality of voltage inputs 104. A motor (not illustrated) may be coupled to the motor protection relay 100 using one or more of the voltage inputs 104. The motor protection relay 100 may further include one or more outputs 106. The outputs 106 may include, for example, outputs to control the motor, and/or alarm outputs for indicating a fault associated with a motor coupled to the motor protection relay 100. The motor protection relay 100 may further include one or more integrated current transformers 108. The one or more integrated current transformers 108 may include zero-sequence current transformers. The motor protection relay 100 may further include one or more additional inputs and/or outputs 110. Such one or more additional inputs and/or outputs 110 may include, for example, auxiliary programmable inputs for the motor protection relay 100, zero-sequence connectivity for direct or resistive grounded power systems, and/or network coupling for input output devices, displays, and the like. Furthermore, the motor protection relay 100 may include an Ethernet port 112. The Ethernet port 112 may facilitate wired coupling of a computing device to the motor protection relay 100 for data acquisition, control, and/or programming various set points associated with the motor protection relay 100.

Unlike conventional motor protection relays, the motor protection relay 100 does not include a physical user interface which, in conventional motor protection relays, would typically be located on an exterior of the housing 102. Rather, as will be described in greater detail below, the motor protection relay 100 may be monitored, controlled, or programmed using a computing device, such as a tablet computer or mobile phone, that may be wirelessly coupled to the motor protection relay 100. To that end, internal components of the motor protection relay 100 may enable wireless connectivity to external computing devices. Such wireless connectivity may be established using one or more wireless communication protocols that will be familiar to those of ordinary skill in the art, such protocols including, but not limited to, Bluetooth, Wi-Fi, ZigBee, near field wireless communication, and other short range, medium-range, and long-range wireless communication protocols.

Figure 2:
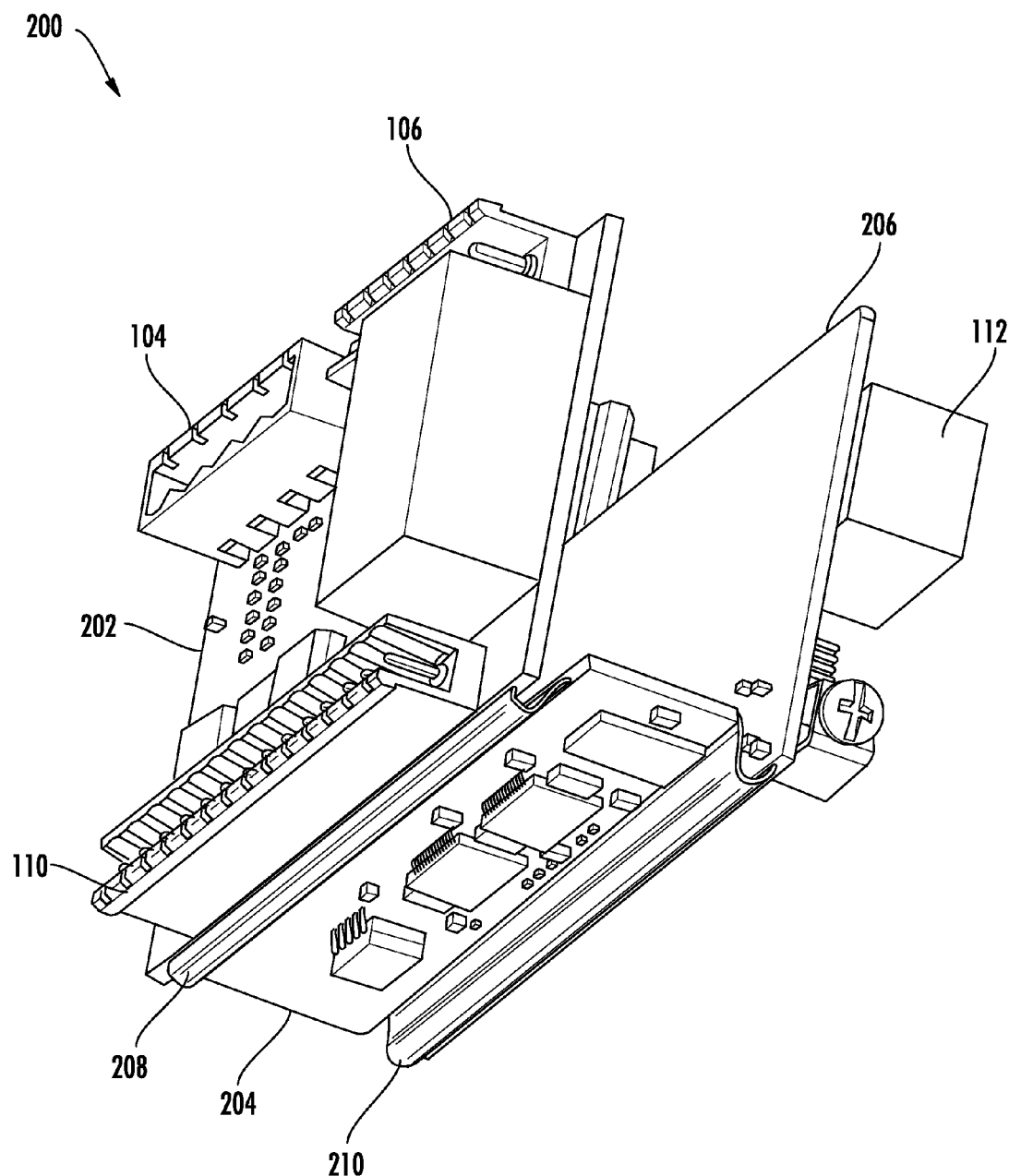
FIG. 2 is a perspective view illustrating a printed circuit board that may be implemented in the motor protection relay shown in FIG. 1.

FIG. 2 illustrates a printed circuit board 200 that may be disposed within the housing 102 of the motor protection relay 100, according to an embodiment of the disclosure. The printed circuit board 200 may include a first printed circuit board section 202, a second printed circuit board section 204, and a third printed circuit board section 206. The printed circuit board 200 may further include a first flexible interconnect element 208 that couples the first printed circuit board section 202 to the second printed circuit board section 204. Additionally, a second flexible interconnect element 210 may couple the second printed circuit board section 204 to the third printed circuit board section 206. The first flexible interconnect element 208 may include one or more wired connections that enable unidirectional and/or bidirectional communication between various components on the first printed circuit board section 202 and on the second printed circuit board section 204. Similarly, the second flexible interconnect element 210 may include one or more wired connections that enable unidirectional and/or bidirectional communication between various components on the second printed circuit board section 204 and on the third printed circuit board section 206. In an alternative embodiment of the present disclosure, the printed circuit board 200 may include only two rigid printed board sections that are coupled together using a flexible interconnect element.

Owing to the flexible electrical connections between the first, second, and third printed circuit board sections 202-206, the printed circuit board 200 may be configured in a compact arrangement, as is illustrated in FIG. 2. Specifically, the first flexible interconnect element 208 and the second flexible interconnect element 210 allow folding of the printed circuit board 200 in the illustrated compact arrangement, with first and second printed board sections 202, 206 confront one another and substantially perpendicular to the third printed circuit board section 204. Advantageously, this compact arrangement of the printed circuit board 200 facilitates enclosure within the housing 102 which has a relatively small footprint or form factor compared to housings of conventional motor protection relays which typically house a single, rigid printed circuit board having a greater surface area than any of the first, second, or third printed circuit board sections 202-206.

Figure 3:
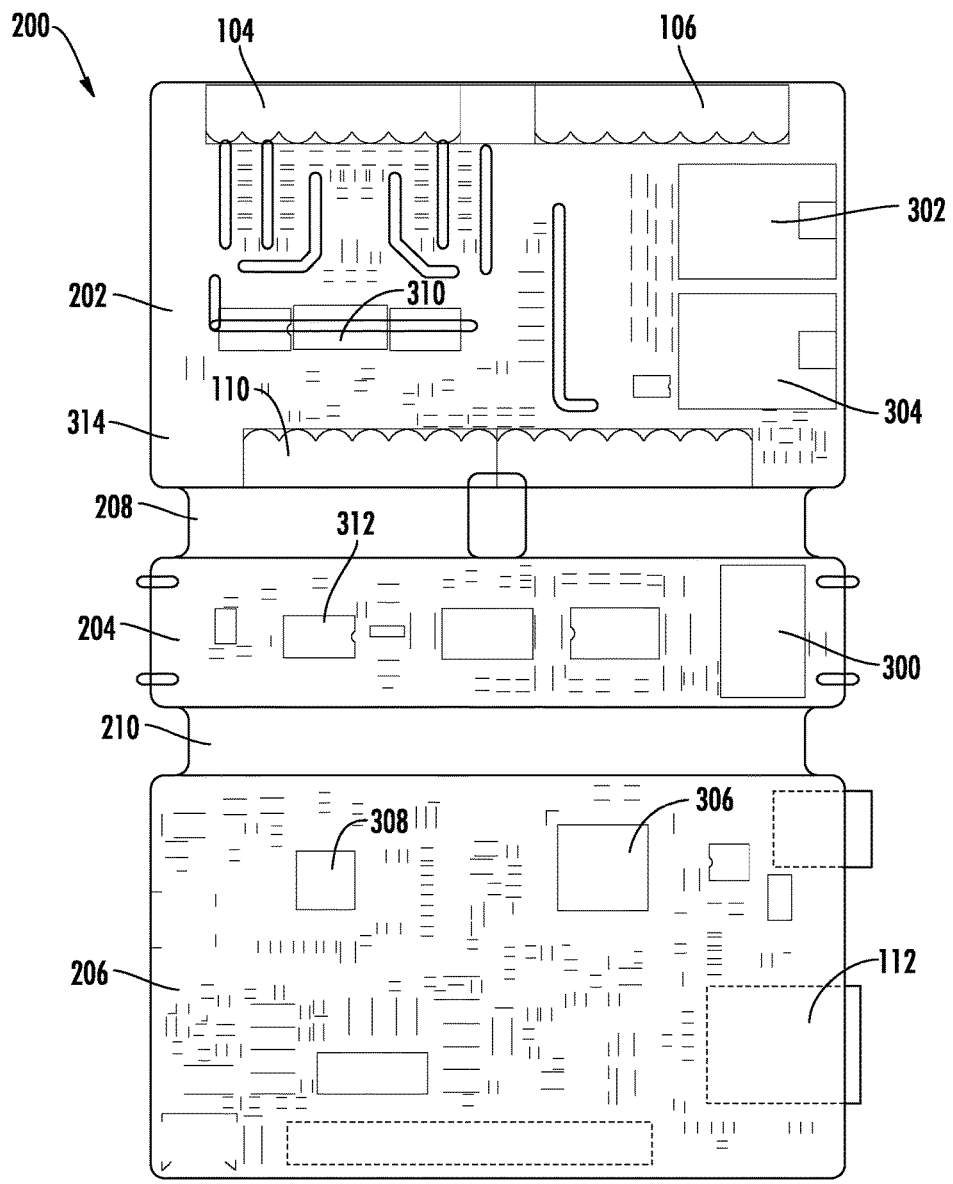
FIG. 3 is a schematic view illustrating the printed circuit board shown in FIG. 2 in an unfolded configuration.

FIG. 3 is a schematic view illustrating the printed circuit board 200 in an unfolded, substantially planar configuration. The printed circuit board 200 may include a wireless communication interface 300. The wireless communication interface 300 may be configured to enable one or more wireless communication protocols that will be familiar to those of ordinary skill in the art, such protocols including, but not limited to, Bluetooth, Wi-Fi, ZigBee, near field wireless communication protocols, and other short range, medium-range, and long-range wireless communication protocols. In one embodiment, the wireless communication interface 300 facilitates wireless connectivity of the motor protection relay 100 to a computing device, such as a tablet computer, a laptop computer, a desktop computer, a mobile phone (e.g., a "smart" phone), etc. When a computing device is connected to the motor protection relay 100 thusly, the computing device may be used to monitor and/or configure the motor protection relay from a distance (i.e., remotely), as opposed to requiring a technician to physically manipulate an interface located on the motor protection relay 100. For example, by way of the wireless communication interface 300, a computing device may be used to configure motor protection settings of the motor protection relay 100. Such settings may include, but are not limited to, inverse or instantaneous phase overcurrent protection settings, phase to phase protection settings, phase unbalance protection settings, ground fault protection settings, motor jam protection settings, underload or under power protection settings, off-nominal frequency protection settings, out of phase sequence condition settings, motor backspin settings, emergency motor override settings, current transformer settings, and the like.

The printed circuit board 200 may include various additional electronic components disposed thereon. For example, the printed circuit board 200 may include a first output relay 302 and a second output relay 304. The printed circuit board 200 may further include a central processing unit 306 (e.g., a microprocessor, an application specific integrated circuit, etc.). The central processing unit 306 may be configured to enable various functions associated with the motor protection relay 100. For example, the central processing unit 306 may be configured to execute a sequence of stored instructions to enable the various functionalities associated with the motor protection relay 100. In a particular implementation, the central processing unit 306 processes wireless communication signals received from the wireless communication interface 300. Such wireless communication signals may include settings used to configure the motor protection relay 100. The settings may be wirelessly transmitted from an external computer device and may be received by the wireless communication interface 300. In some embodiments, the wireless communication interface 300 may be integral with the central processing unit. The printed circuit board 200 may include an analog-to-digital converter 308 for processing mixed signal functions of components disposed on the printed circuit board 200. Furthermore, the printed circuit board may include DC to DC converters 310 and 312 to handle DC voltage level conversions.

A protective, conformal coating 314 may cover the printed circuit board 200 and the electrical components disposed thereon. In one embodiment, the conformal coating 314 may be a polymeric film that covers a surface of the printed circuit board 200 as well as the components disposed on the printed circuit board 200. In other embodiments, the conformal coating 314 may be an epoxy or similar material. The conformal coating 314 advantageously protects the printed circuit board 200 and the components disposed thereon from environmental contaminants and harmful environmental conditions, such as moisture, particulate matter, temperature fluctuations, and the like. In some embodiments, the entireties of the first, second, and third printed circuit board sections 202-206 may be covered by the conformal coating, while the first and second flexible interconnect elements 208, 210 are not covered. In other embodiments, the first, second, and third printed circuit board sections 202-206 and the first and second flexible interconnect elements 208, 210 may all be covered by the conformal coating 314.

The conformal coating 314 of the present disclosure provides a distinct advantage relative to conventional motor protection relays. Specifically, since conventional motor protection relays feature integrated user interfaces (e.g., buttons, knobs, displays, touchscreens, etc.) that require numerous points of electrical connection to printed circuit boards within a motor protection relay housing, it is generally impossible or impractical to entirely cover such circuit boards with a protective, conformal coating. Owing to the absence of an integrated, physical interface, the motor protection relay 100 of the present disclosure does not require any such electrical connections to the printed circuit board 200, and the printed circuit board 200 may therefore be entirely coated with the protective, conformal coating 314. Thus, printed circuit boards in conventional motor protection relays are more susceptible to environmental contaminants and conditions relative to the printed circuit board 200 in the motor protection relay 100 of the present disclosure.

Figure 4:
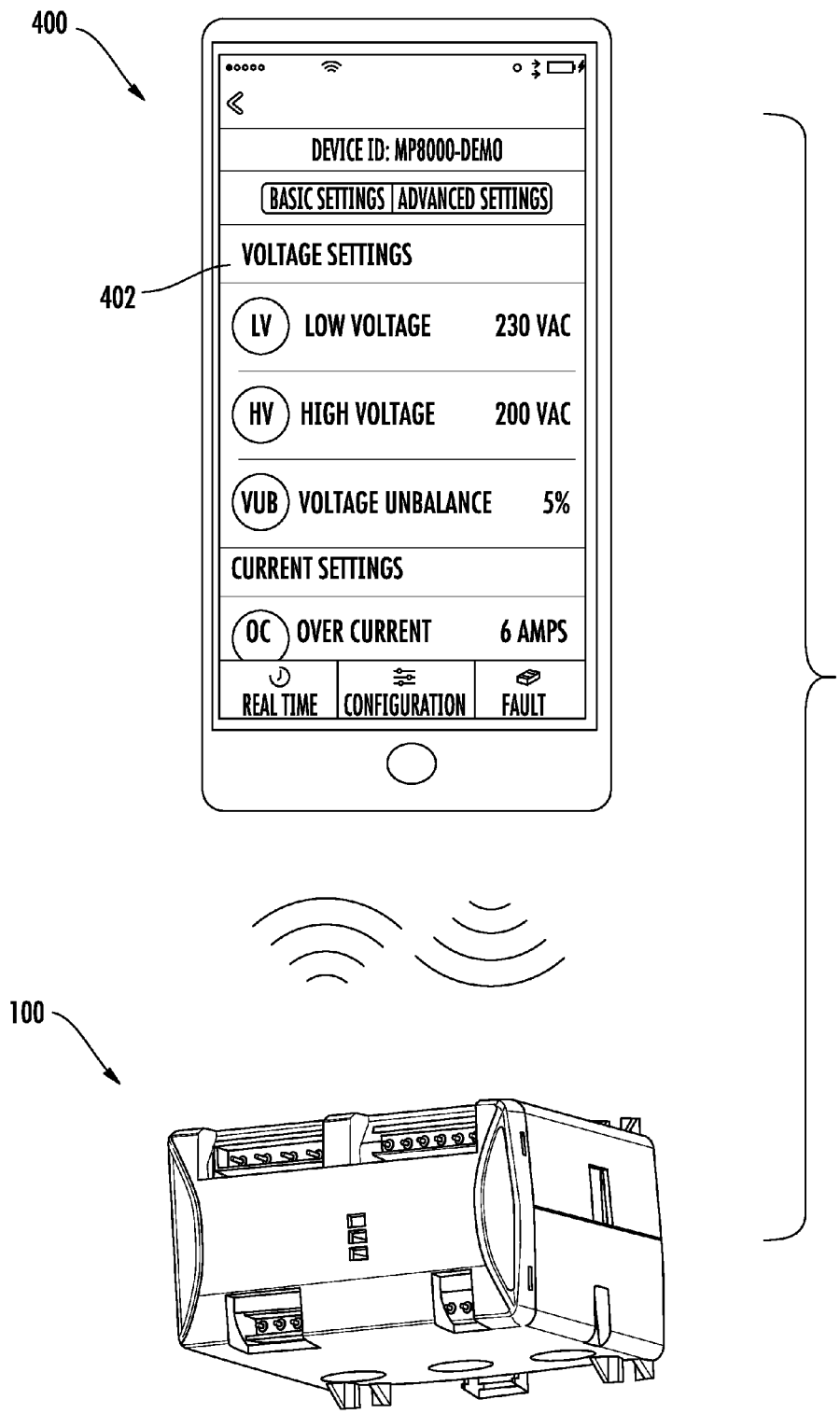
FIG. 4 is a schematic view illustrating an exemplary computing device in wireless communication with the motor protection relay according to an embodiment of the present disclosure.

FIG. 4 illustrates an exemplary computing device 400 (e.g., a smart phone) wirelessly communicating with the motor protection relay 100 from a distance. As illustrated, the exemplary computing device 400 includes a user interface 402 (e.g., a graphical user interface provided by a software application). The user interface 402 may be used to configure settings associated with the motor protection relay 100. In one exemplary embodiment, the user interface 402 may be used configure voltage settings, current settings, inverse or instantaneous phase overcurrent protection settings, phase to phase protection settings, phase unbalance protection settings, ground fault protection settings, motor jam protection settings, underload or under power protection settings, off-nominal frequency protection settings, out of phase sequence condition settings, motor backspin settings, emergency motor override settings, current transformer settings, and the like, which are configurable in the motor protection relay 100.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

I claim:

1. A motor protection relay, comprising:
a housing; and
a printed circuit board disposed within the housing, the printed circuit board including a central processing unit and a wireless communication interface, the wireless communication interface adapted to receive wireless communication signals for configuring operating parameters of the motor protection relay via the central processing unit;
wherein the printed circuit board includes a first printed circuit board section, a second printed circuit board section and a third printed circuit board section electrically connected to one another by a flexible interconnect member, wherein the first printed circuit board section and the third printed circuit board section are oriented perpendicular to the second printed circuit board section.

2. The motor protection relay according to claim 1, wherein the wireless communication interface enables wireless communication using at least one of Bluetooth, Wi-Fi, and ZigBee wireless communication protocols.

3. The motor protection relay according to claim 1, wherein the operating parameters include at least one of voltage settings, current settings, inverse or instantaneous phase overcurrent protection settings, phase to phase protection settings, phase unbalance protection settings, ground fault protection settings, motor jam protection settings, underload or under power protection settings, off-nominal frequency protection settings, out of phase sequence condition settings, motor backspin settings, emergency motor override settings, and current transformer settings.

4. The motor protection relay according to claim 1, wherein the printed circuit board is covered by a protective conformal coating.

5. The motor protection relay according to claim 4, wherein the conformal coating is a polymeric film.

6. A motor protection relay comprising:
a housing; and
a printed circuit board disposed within the housing, the printed circuit board including a central processing unit and a wireless communication interface, the wireless communication interface adapted to receive wireless communication signals for configuring operating parameters of the motor protection relay via the central processing unit;
wherein the printed circuit board includes a first printed circuit board section, a second printed circuit board section and a third printed circuit board section electrically connected to one another by a flexible interconnect member, wherein the first printed circuit board section and the third printed circuit board section are oriented perpendicular to the second printed circuit board section; and wherein the motor protection relay is devoid of a physical user interface located within, or on an exterior of, the housing.

* * * * *

UNITED STATES PATENT AND TRADEMARK OFFICE
CERTIFICATE OF CORRECTION

PATENT NO. : 10,281,908 B2
APPLICATION NO. : 15/790286
DATED : May 7, 2019
INVENTOR(S) : Kip M. Larson Page 1 of 1

It is certified that error appears in the above-identified patent and that said Letters Patent is hereby corrected as shown below:

On the Title Page

Item (72) Inventor: Please correct to read --Kip M. Larson, Rapid City, SD (US), Kristophor Ray Jensen, Chicago, IL (US)--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*